United States Patent [19]
Hanstad

[11] 3,835,563
[45] Sept. 17, 1974

[54] LICENSE PLATE RETAINER

[76] Inventor: Robert D. Hanstad, 1450 N. Springfield Ave., Chicago, Ill. 60651

[22] Filed: Oct. 2, 1972

[21] Appl. No.: 294,278

[52] U.S. Cl. .............................................. 40/209
[51] Int. Cl. ............................................ G09f 7/00
[58] Field of Search............ 40/10, 129 C, 200, 209

[56] References Cited
UNITED STATES PATENTS

| | | | |
|---|---|---|---|
| 1,411,257 | 4/1922 | Anderson et al. ............ | 40/209 |
| 1,864,641 | 6/1932 | Davis .............................. | 40/209 |
| 1,887,087 | 11/1932 | Frizner........................... | 40/209 |
| 2,082,434 | 6/1937 | White ............................ | 40/209 |
| 2,530,821 | 11/1950 | Hubbell.......................... | 40/10 R |
| 2,563,159 | 8/1951 | Clark ............................. | 40/10 R |
| 2,853,818 | 9/1958 | Simon et al..................... | 40/209 |
| 2,877,583 | 3/1959 | Poole ............................. | 40/209 |

FOREIGN PATENTS OR APPLICATIONS

| | | | |
|---|---|---|---|
| 404,657 | 1/1934 | Great Britain................. | 40/209 |
| 702,635 | 1/1954 | Great Britain................. | 40/209 |

Primary Examiner—Jerome Schnall
Assistant Examiner—Wenceslao J. Contreras
Attorney, Agent, or Firm—Hibben, Noyes & Bicknell

[57] ABSTRACT

A display holder for a vehicle license-type plate having a rigid backing section and retainer flanges extending along opposite longitudinal edges of the backing section engageable with the upper and lower longitudinal edges of a plate with one of the flanges providing a slot into which a first edge of a plate is adapted to be inserted and the other flange permitting the second edge of the plate being inserted beneath the end thereof for holding the second edge, and the said other flange is provided with a camming surface which is adapted to be engaged by the second edge of the plate and resiliently moved upwardly to permit the second edge being inserted between the edge of the flange and the backing section while the first edge of the plate is held in the said slot.

2 Claims, 5 Drawing Figures

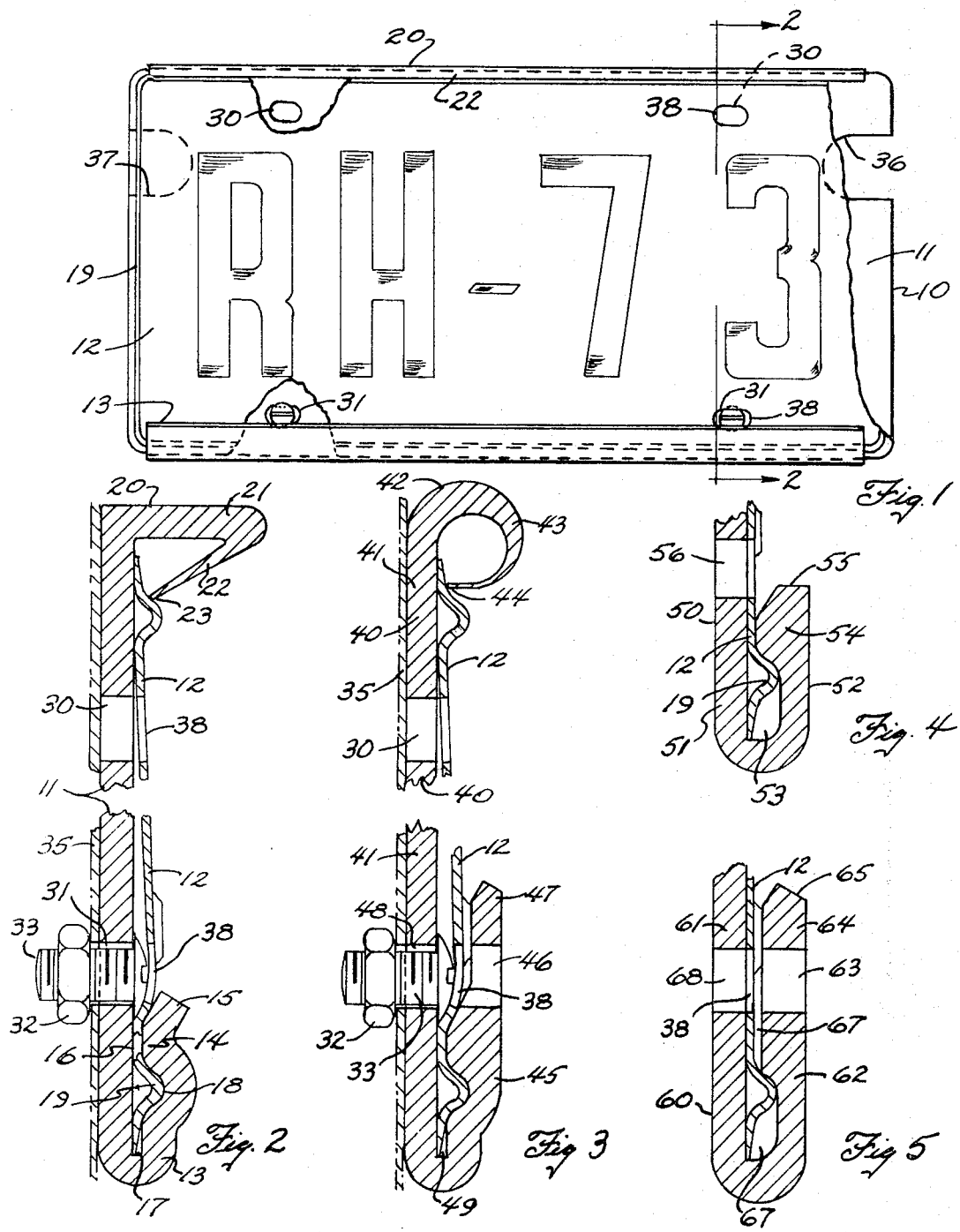

LICENSE PLATE RETAINER

The present invention relates generally to a retainer for a plate member and more particularly to an improved retainer for a motor vehicle license plate.

All of the United States have adopted a uniform sized vehicle license plate with uniform mounting holes, and the license plates are commonly mounted on a vehicle by means of a removable fastener. Occasionally, a protective framing member supported by the license plate is used. In some instances a license plate holder is provided on the vehicle and into which a license plate is inserted (See U.S. Pat. Nos. 1,520,324, 2,583,818 and 2,603,015). None of these license plate holders, however, retain the plate in a manner which permits the plate being readily mounted without requiring the use of pins, bolts or other removable fastener members, while at the same time preventing the plate being readily removed from the holder or vehicle.

It is therefore an object of the present invention to provide an improved retainer for a plate, such as a vehicle license plate, which permits mounting the plate therein without the use of any removable fasteners and at the same time prevents the plate being readily removed therefrom.

Other objects of the invention will be apparent to those skilled in the art from the following detailed description and claims when read in the light of the accompanying drawing, wherein:

FIG. 1 is a front elevational view partly broken away showing the plate retainer of the present invention having a vehicle license plate secured therein and mounted on a supporting surface;

FIG. 2 is a vertical sectional view taken along the lines 2—2 of FIG. 1;

FIG. 3 is a vertical sectional view of a modified form of the present invention;

FIG. 4 is a fragmentary vertical sectional view of another modified form of the present invention; and FIG. 5 is a fragmentary vertical sectional view of still another modification of the present invention.

The license plate retainer 10 of the present invention, as shown in FIGS. 1 and 2, comprises a rigid, flat, web-like backing member 11 which forms the main support for the vehicle license plate 12. The backing member 11 has a height slightly greater than the height of the license plate 12 to be held therein and length substantially the same as the license plate 12. The lower edge of the backing member 11 is provided with an outwardly and upwardly extending lower flange 13 which has an intermediate portion 14 turned inwardly toward said backing member 11 to provide a restriction or narrow passage 16 between the backing member 11 and flange 13. The lower flange 13 is also preferably provided with a longitudinal extending groove 18 formed in the inner surface thereof immediately below the portion 14 which is adapted to receive therein a portion of the rib 19 which is formed around the periphery of the standard license plate 12, thereby more securely holding the lower edge portion of the license plate 12 in the retainer 10. The outer end 15 of the lower flange 13 is turned outwardly away from the backing member 11 to provide a tapered inlet to the passage 16 and slot 17 formed between the inner surface of the lower flange 13 and the lower portion of the backing member 11 into which the lower edge of the license plate 12 can be inserted when the flange 13 is flexed outwardly. The flange 13 preferably has a length less than the length of the plate 12 such that the opposite ends of the flange 13 terminate inside the curved radii formed by the upwardly curved rib 19 of the plate 12 adjacent the lower corners thereof.

The upper edge of the backing member 11 is provided with a depending upper flange 20 which is spaced from said lower flange 13 a distance less than the height of the license plate 12. The depending upper flange 20 is comprised of a section 21 extending outwardly from the backing member 11 and has an end section 22 which extends downwardly and inwardly toward the backing member 11, preferably tapered toward the end 23 and having the end 23 terminating adajcent but spaced from the outer surface of the backing member 11. The depending upper flange 20, and preferably the end section 22, is made sufficiently resilient to permit flexing the end of the flange 20 by pressing the upper edge of the plate against the outer surface of section 22 and effecting a "camming" movement of the end 23 upwardly sufficiently to permit the upper edge portion of the license plate 12 being inserted between the end 23 of the flange 20 and the backing member 11 while the lower edge of the license plate 12 is seated in the slot 17 without distorting the license plate 12. The downwardly and inwardly extending end section 22 of the depending upper flange 20 is preferably in the form of a flat surface lying in a plane which forms an angle preferably not less than about 90° (i.e. about 120°) with the plane of said backing member to facilitate the end 23 being readily moved upwardly by the "camming" action of the upper edge of the license plate when the upper edge of the plate 12 is pressed downwardly against the flange section 22 while being mounted in the retainer 10, as will be described hereinafter.

The backing member 11 is provided with at least two and preferably four spaced passages 30, 31, 30', 31' extending therethrough which are positioned inwardly from the upper and/or lower edges and sides of the backing member 11 for receiving the shank 33 of a mounting fastener 32 by which the retainer 10 is secured to a fixed support 35, such as the bumper of a vehicle. The spaced passages extending through the backing member are formed opposite the mounting holes 38 in the standardized automobile license plate 12 to facilitate attaching or removing the retainer 10, but it should be apparent that the mounting fastener is not intended nor required to pass through the vehicle license plate and any other means can be used to secure the retainer 10 to the supporting surface.

The backing member 11 is also preferably provided with finger openings 36, 37 which extend inwardly from the opposite ends of the backing member 11 spaced downwardly from the "camming" upper flange 20. The finger openings 36, 37 facilitate application of pressure on the back side of the plate 12 when it is necessary to remove the plate from the retainer 10, as when a new plate must be displayed.

In the modified form of the retainer shown in FIG. 3 the upper flange 42 of the license plate retainer 40 is in the form of an outwardly, downwardly and inwardly curved section 43 with the inner end 44 thereof, preferably being tapered toward the end, terminating adjacent but spaced from the outer surface of the backing member 41. The end 44 of the curved upper flange 42 is adapted to be resiliently moved upwardly to permit inserting the upper end portion of the license plate 12 between the said end 44 of the flange 42 and the outer surface of the backing member 41 without distorting the upper edge portion of the license plate 12 while the lower edge of the license plate 12 is seated in the slot 49 formed by the lower flange 45 and the outer surface of the backing member 41.

The lower flange 45 of the retainer 40 shown in FIG. 3 has the lower portion thereof constructed generally as shown in FIGS. 1 and 2, but is further modified by having the upper end portion 47 of the flange 45 extending above the passage 48 in the backing member 41. The upper end portion 47 of the flange 45 is provided with a passage 46 which extends therethrough and is disposed opposite the lower passage 48 in the backing member 41 to permit inserting a screw driver or like tool for engagement with the fastener member used for mounting the retainer 40 on a vehicle bumper or like fixed support. The upper end of the flange 45 is tapered outwardly to provide a tapered entrance to the slot 49 so as to facilitate inserting the license plate 12 in the said slot 49.

In the form of the invention shown in FIG. 4 the lower flange 52 of the retainer 50 is modified from that shown in FIGS. 1 and 2 by eliminating the groove 18 formed in the inner surface of the lower flange 13 and increasing the length of the slot 53 formed between the backing member 51 and the flange 52 by providing on the upper portion of the flange 52 an enlarged section 54 which extends inwardly toward the backing member 51 and which provides a bearing surface for engaging the upper edge of the rib 19 of the license plate 12. The upper end 55 of the flange 52 which extends only slightly above the passage 56 in the backing member 51 is tapered outwardly to provide a tapered opening at the upper end of the slot 53 to facilitate insertion of the plate 12 therein.

In the modified form of the invention shown in FIG. 5 the lower flange 62 of the retainer 60 has the general configuration shown in FIG. 4, but is further modified by having the enlarged upper end section 64 extending above the passage 63 in backing member 61 and the oppositely disposed passage 68 in the lower flange 62. The end 65 of the flange 62 provides a tapered inlet passage for the slot 67 formed between the flange 62 and the outer surface of the backing member 61.

In mounting a license plate in a plate retainer of the type illustrated in FIGS. 1 and 2, after first securing the retainer to the supporting surface of a vehicle by means of the threaded removable fasteners, the lower edge of the license plate is preferably first seated in the slot formed between the inner surface of the lower flange and the outer surface of the backing member. The upper edge of the license plate is then placed in contact with the downwardly and inwardly extending section and the upper edge of the plat pressed downwardly along the length of the upper edge of the license plate to effect an upwardly movement of the lower end of the upper flange sufficient to permit the upper edge of the license plate sliding between the lower end of the upper flange and the surface of the backing member. When the pressure on the upper flange is released the end portion on the upper flange resiliently returns to its original position, resiliently engaging the outer surface of the license plate, preferably along the embossed rib portion of the license plate and holding the license plate securely in the retainer. Because of the resilient engagement of the lower flange along the lower embossed rib of the license plate and the resilient engagement between the upper flange and the embossed rib formed along the upper edge of the license plate, the license plate is securely held in the retainer. Also, the upper and lower flanges have a length such that the ends thereof contact the inner radii of the curved portions of the embossed rib of the license plate; thereby increasing the resistance to longitudinal movement of the plate within the license plate retainer.

It will be understood that the plate retainer of the present invention can be formed by providing a backing member with any combination of upper and lower flanges described herein and the "camming" flange surface can be formed on the lower edge of the backing member instead of the upper edge of the backing member, if desired, without departing from the scope of the present invention. The backing member of the plate retainer can also be the same length as the upper and lower flanges and in this case will be shorter than the length of the license plate mounted thereon. It is also possible to enlarge the lower end of the slot into which the lower edge of the plate is inserted by forming a groove in the backing member rather than in the flange to accommodate a plate having the rib reversed from that of the normal license plate.

The plate retainer of the present invention can be formed of sheet metal or of a plastic material extruded as a continuous strip which is then cut into suitable lengths and mounting holes formed therein or, if desired, the retainer can be injection molded of any suitable plastic material.

It should also be understood that the plate retainer can be secured to a vehicle or other support surface by any suitable means besides the removable fasteners used in the illustrated embodiments. Thus, the retainer can have a bracket fastened to the backing member which can be removably, permanently, or pivotally mounted on a vehicle or the backing member can be permanently affixed to a vehicle, as by welding where the retainer is formed of metal.

I claim:

1. A retainer for holding and displaying therein a vehicle license-type plate having a rib extending around the said plate adjacent the periphery thereof comprising; a rigid backing member wider than the height of a said plate having a first inwardly extending flange formed along one horizontally disposed edge portion thereof which forms with the outer surface of said backing member a narrow slot into which one longitudinal edge portion of said plate can be inserted, a second inwardly extending flange formed along a second horizontally disposed edge portion of said backing member provided with a resilient inner edge portion spaced from said first flange a distance less than the height of said plate and terminating adjacent the outer surface of said backing member, said second flange being resilient movable relative to said member and said first flange for effecting a locking engagement with a second longitudinal edge portion of said plate between said inner edge portion of said second flange and said backing member while said one longitudinal edge portion of said plate is retained in said slot, and at least one of said flanges having a length less than the length of a said plate to be retained therein such that the opposite ends of the said flange are adapted to engage the curved inner radii portions of said rib extending around the periphery of said plate, and said backing member having means for mounting adapted to be on a supporting surface of a vehicle.

2. A retainer for holding and displaying therein a vehicle license-type plate comprising; a rigid backing member wider than the height of a said plate and having a length about equal to that of the said plates, said backing member having a first inwardly extending flange formed along one horizontally disposed edge portion thereof which forms with the outer surface of said backing member a narrow slot into which one longitudinal edge portion of said plate can be inserted, a second inwardly extending flange formed along a second horizontally disposed edge portion of said backing member provided with a resilient inner edge portion spaced from said first flange a distance less than the height of said plate and terminating adjacent the outer surface of said backing member, said second flange being resiliently movable relative to said member and said first flange for effecting a locking engagement with a second longitudinal edge portion of said plate between said inner edge portion of said second flange and said backing member while said one longitudinal edge portion of said plate is retained in said slot, said backing member having a recess extending inwardly from opposite lateral edges of the backing member spaced from said flanges for application of pressure to the back of said plate to facilitate disengaging said plate from said backing member, and said backing member having means for mounting on a supporting surface of a vehicle.

* * * * *